(12) United States Patent
Griffiths et al.

(10) Patent No.: US 6,810,194 B2
(45) Date of Patent: Oct. 26, 2004

(54) CONNECTING OPTICAL FIBERS

(75) Inventors: Ian James Griffiths, Newport (GB); John Kerry, Ipswich (GB); Malcolm Owen Jones, Chepstow (GB)

(73) Assignee: Pirelli General PLC, London (GB)

( * ) Notice: Subject to any disclaimer, the term of this patent is extended or adjusted under 35 U.S.C. 154(b) by 224 days.

(21) Appl. No.: 10/170,545

(22) Filed: Jun. 14, 2002

(65) Prior Publication Data

US 2002/0191942 A1 Dec. 19, 2002

(30) Foreign Application Priority Data

Jun. 15, 2001 (EP) ............................................. 01305228

(51) Int. Cl.$^7$ ............................... G02B 6/00; G02B 6/36
(52) U.S. Cl. ......................................... 385/135; 385/53
(58) Field of Search ................................ 385/135, 134, 385/136, 137, 138, 53, 147, 54, 55, 56, 58, 59, 88, 92; 333/125

(56) References Cited

U.S. PATENT DOCUMENTS

| | | | |
|---|---|---|---|
| 3,933,409 A | * | 1/1976 | Kloots ........................... 385/54 |
| 4,047,797 A | * | 9/1977 | Arnold et al. ............... 385/134 |
| 4,184,739 A | * | 1/1980 | d'Auria et al. ................. 385/54 |
| 4,184,740 A | * | 1/1980 | d'Auria et al. ................. 385/54 |
| 4,193,661 A | * | 3/1980 | d'Auria et al. ................. 385/54 |
| 4,374,596 A | | 2/1983 | Schlemmer et al. |
| 4,657,340 A | * | 4/1987 | Tanaka et al. ................. 385/59 |
| 4,744,629 A | * | 5/1988 | Bertoglio et al. ........... 385/137 |
| 5,125,060 A | | 6/1992 | Edmundson |
| 5,134,678 A | * | 7/1992 | Essert ........................... 385/86 |
| 5,157,749 A | * | 10/1992 | Briggs et al. ................. 385/56 |
| 5,210,812 A | * | 5/1993 | Nilsson et al. .............. 385/100 |
| 5,235,665 A | * | 8/1993 | Marchesi et al. ........... 385/135 |
| 5,671,316 A | * | 9/1997 | Yuhara et al. .............. 385/137 |
| 5,764,843 A | | 6/1998 | Macken et al. |
| 5,768,459 A | * | 6/1998 | Wolter et al. ................. 385/88 |
| 5,796,908 A | * | 8/1998 | Vicory ........................ 385/135 |
| 5,870,519 A | * | 2/1999 | Jenkins et al. ............. 385/135 |
| 5,892,870 A | * | 4/1999 | Fingler et al. ................ 385/59 |

(List continued on next page.)

FOREIGN PATENT DOCUMENTS

| | | |
|---|---|---|
| EP | 0 980 012 | 8/1999 |
| EP | 1 026 530 A1 | 8/2000 |
| EP | 01305038 | 6/2001 |
| GB | 2 283 373 | 5/1995 |
| GB | 2 300 488 | 11/1996 |
| GB | 2 325 531 | 11/1998 |
| GB | 2 351 333 | 12/2000 |
| JP | 08-075970 | 3/1996 |
| JP | 10-062668 | 3/1998 |
| JP | 11-051852 | 2/1999 |
| WO | WO 98/53354 | 11/1998 |

OTHER PUBLICATIONS

Shinichi; "Optical Fiber Cable for Pneumatic Force Feeding"; Patent Abstract of Japan, of JP 10–197765 A, Jul. 31, 1998.

Kerry et al.; "An Assembly for Use in Connecting Optical Fibres"; U.S. Patent Application No. 10/162,766, filed Jun. 6, 2002.

*Primary Examiner*—Jared J. Fureman
(74) *Attorney, Agent, or Firm*—Finnegan, Henderson, Farabow, Garrett & Dunner, L.L.P.

(57) ABSTRACT

An assembly for use in connecting optical fibers includes a housing (12) for optical fiber joints and a fiber routing device (70) associated with the housing. The housing has a first inlet (41) for receiving optical fibers from a primary side of an optical fiber network and a second inlet (13) for receiving optical fibers from a customer side of an optical fiber network. The fiber routing device (70) has an outlet (78) for feeding fibers from the customer side of the optical fiber network into the second inlet (13) and two inlets (72, 74) for receiving the customer-side optical fibers for feeding to its outlet.

24 Claims, 8 Drawing Sheets

U.S. PATENT DOCUMENTS

| | | | |
|---|---|---|---|
| 5,946,440 A | * | 8/1999 | Puetz ........................ 385/135 |
| 5,966,487 A | * | 10/1999 | Gilliland et al. .............. 385/92 |
| 6,282,360 B1 | | 8/2001 | Milanowshi et al. |
| 6,418,264 B1 | * | 7/2002 | Hough et al. ............... 385/135 |
| 6,466,725 B2 | * | 10/2002 | Battey et al. ............... 385/135 |
| 6,592,266 B1 | * | 7/2003 | Hankins et al. .............. 385/53 |
| 6,688,776 B2 | * | 2/2004 | Simmons et al. ............ 385/53 |
| 6,735,354 B2 | * | 5/2004 | Hamada ..................... 385/147 |
| 2002/0064364 A1 | * | 5/2002 | Battey et al. ............... 385/136 |
| 2002/0159745 A1 | * | 10/2002 | Howell et al. ............. 385/135 |
| 2004/0057691 A1 | * | 3/2004 | Doss et al. ................ 385/134 |
| 2004/0070467 A1 | * | 4/2004 | Lowenborg et al. ........ 333/125 |
| 2004/0086252 A1 | * | 5/2004 | Smith et al. ............... 385/135 |

\* cited by examiner

CONNECTING OPTICAL FIBERS

BACKGROUND OF THE INVENTION

The invention relates to connecting optical fibres and particularly to the management and routing of optical fibres at locations at which they are joined.

Typically in telecommunications, such joints are provided where it is desired to distribute optical fibres to customers. At the joint, optical fibres leading from a main, or primary network may be connected to fibres on a secondary network leading to individual customer locations. Hereinafter, fibres from the main network will be described as being supplied along a primary cable and as primary fibres, and fibres leading to customer locations will be described as secondary fibres. Such joints are usually provided under ground and may be accessed via a man-hole to enable connection work and routing to be carried out by an engineer.

Secondary optical fibres may be provided in enhanced performance fibre units (EPFU) which may comprise one or more fibres extending along a tube. The tube may be installed without optical fibres and when required, the optical fibres are blown through the tube using known techniques. Typically, the tubes are made from polyethylene and have a carbon loaded radially inner surface to increase conductivity. This helps to dissipate static charges developed during blowing which can hinder installation of the fibres along the tube.

Primary cables typically comprise a plurality of optical fibre bundles, or units, each bundle typically comprising eight or twelve fibres. At a joint location, the optical fibre bundles are separated and the individual optical fibres are managed and routed to housings, or splice trays, where they may be connected to secondary optical fibres leading to individual customer locations. An example of these housings or splice trays is disclosed in the assignee's earlier application, U.S. Ser. No. 09/424,042, the content of which is incorporated herein by reference. Each housing comprises one port into which fibres may be routed from a primary cable and a second port into which secondary fibres may be routed from customer locations. Alternatively, the housings can be used to connect fibres from two primary cables.

FIGS. 1 and 2 illustrate schematically a joint arrangement 10 in which a plurality of housings 12, as disclosed in U.S. Ser. No. 09/424,042, are utilised for joining primary and secondary fibres. The arrangement comprises a stack of housings, or splice trays, 12 each of which has a first inlet port (not shown) and a second inlet port 13. Attached to the splice trays are two guide devices 14, each of which is associated with four splice trays.

The guide devices 14 each have an inlet arranged to receive a primary-side optical fibre bundle 16 containing a number of optical fibres and four outlets through which fibres are directed into respective inlet ports of the four housings associated with the guide device. Tracks (not shown) are provided for guiding the optical fibres between the inlet and the outlets.

As shown in FIG. 2, a primary fibre, or fibres 18, from the fibre bundle 16 is/are guided into a splice tray 12 to be spliced with a secondary fibre 20 to provide a part of a telecommunications circuit.

Generally, a primary cable contains more than one optical fibre bundle 16, for example, twelve bundles, which may each contain eight optical fibres making ninety-six optical fibres in total. Previously, two fibres were needed to allow communication at a customer location—a first optical fibre transmitting light and a second optical fibre receiving light. Therefore, the exemplary primary cable having twelve optical fibre bundles with eight fibres in each may be connected to a joint arrangement for distribution to a maximum of forty-eight customer locations. Each customer is allocated at least one splice tray from which two secondary fibres lead to the customer location via the outlet port 13.

Recently, single fibre circuits have been introduced in which a single fibre both transmits and receives light. In this case, only a single primary and secondary fibre need be guided to each of the splice trays. The arrangement shown in FIGS. 1 and 2 does not readily permit the advantages of single fibre circuits to be obtained since the splice trays have only one outlet port, which does not provide for flexibility of fibre routing or the possibility of using spare capacity in the splice trays for routing new fibres into an existing installation converted from twin fibre to single fibre use.

SUMMARY OF THE INVENTION

It is an object of the invention to provide systems and assemblies for use in connecting optical fibres that can provide improved flexibility and choice in fibre routing.

It is another object of the invention to provide a method of and apparatus for routing additional optical fibres into a housing that is arranged to house joints between optical fibres.

It is a further object of the invention to provide methods of and apparatus for permitting additional optical fibres to be routed into the housings of existing optical fibre installations to permit advantage to be taken of single fibre circuits in place of twin fibre circuits.

The invention provides an assembly for use in connecting optical fibres, said assembly comprising a housing for optical fibre joints and a fibre routing device associated with said housing, said housing having a first inlet for receiving optical fibres from a primary side of an optical fibre network and a second inlet for receiving optical fibres from a customer side of an optical fibre network and defining pathways leading from said first and second inklets to an interior region of said housing that includes locating portions for locating optical fibre joints, and said fibre routing device having an insert portion axially insertable into said second inlet for locating and supporting the routing device relative to the housing at least two inlets for receiving optical fibres from said customer side of the optical fibre network and an outlet defined in said insert portion and connected with said routing device inlets such that fibres from said customer side of an optical fibre network received in said routing device inlets are routed into said second inlet of the housing via said routing device outlet.

The invention also provides a method of routing optical fibres to an optical fibre joint, said method comprising:
  introducing at least one optical fibre from a primary side of an optical fibre network into a first of two inlets of a housing for optical fibre joints;
  axially inserting an outlet end of a fibre routing device into a second of said two inlets such that an outlet of said fibre routing device feeds into said second inlet and said fibre routing device is located and supported relative to said housing by engagement between said outlet end and said second inlet, said fibre routing device having a plurality of entry points for optical fibres which entry points feed to said outlet; and
  introducing an optical fibre from a customer side of an optical fibre network into said housing by routing said optical fibre through a first of said entry points, said outlet and said second inlet of the housing.

The invention also provides an optical fibre installation comprising:

a plurality of housings for optical fibre joints arranged in a stack, said housings each having a first inlet for receiving optical fibres from a primary side of an optical fibre network, a second inlet for receiving optical fibres from a customer side of an optical fibre network and defining tracks for optical fibres leading from said first and second inlets to an interior region of said housing that includes locating portions for locating optical fibre joints;

a guide assembly for guiding optical fibres from said primary side of an optical fibre network into said housings, said guide assembly being mounted on said stack of housings and having at least one inlet port for receiving primary optical fibres and a plurality of outlet ports, each said outlet port being associated with a first inlet of one of said housings; and a plurality of fibre routing devices, each said fibre routing device having an insert portion axially inserted into a said second inlet of a said housing such that the routing device is located and supported relative to said housing by interengagement between the second inlet of the housing and the insert portion of the routing device and an inlet end disposed externally of the housing and having at least two inlets for receiving optical fibres from said customer side of the optical fibre network, said at least two inlets being connected by passageways with an outlet defined in said insert portion such that optical fibres from said customer side of an optical fibre network received in said at least two inlets are routed into the said second inlet of the housing in which the insert portion is inserted via the routing device outlet.

BRIEF DESCRIPTION OF THE DRAWINGS

In order that the invention may be well understood an embodiment thereof, which is given by way of example only, will now be described with reference to the drawings, in which.

DESCRIPTION OF THE PREFERRED EMBODIMENTS

Figure 1:
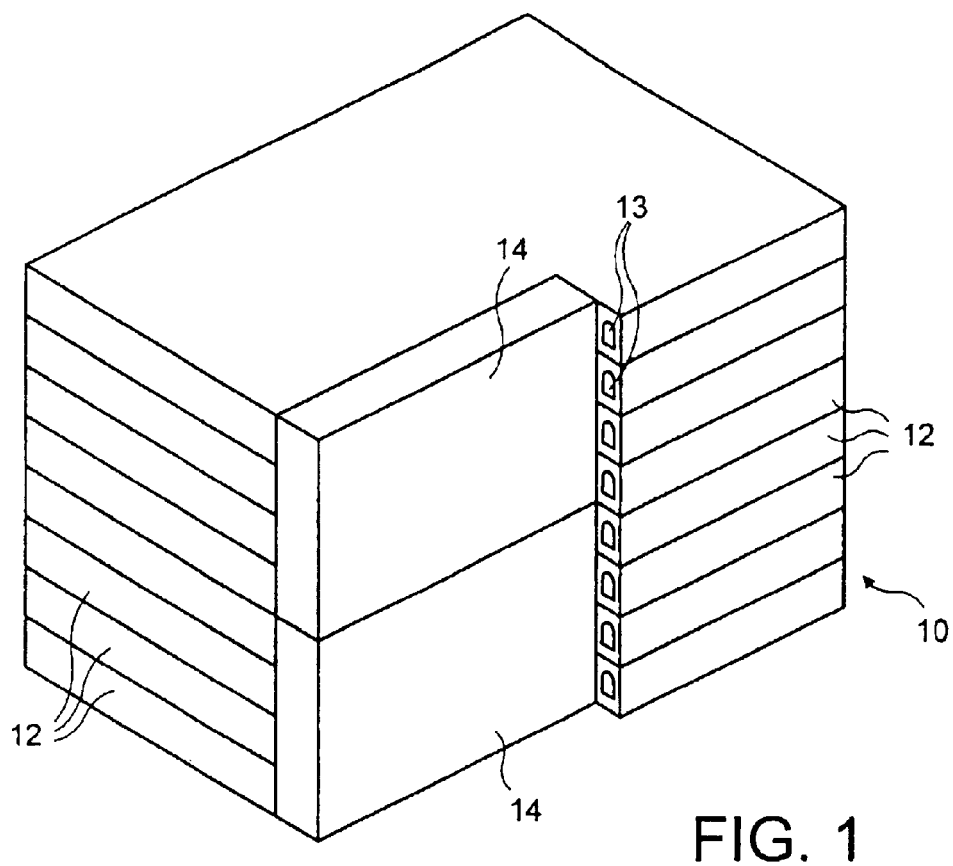
FIG. 1 is a schematic perspective view of an assembly for use in connecting optical fibres.
Figure 2:
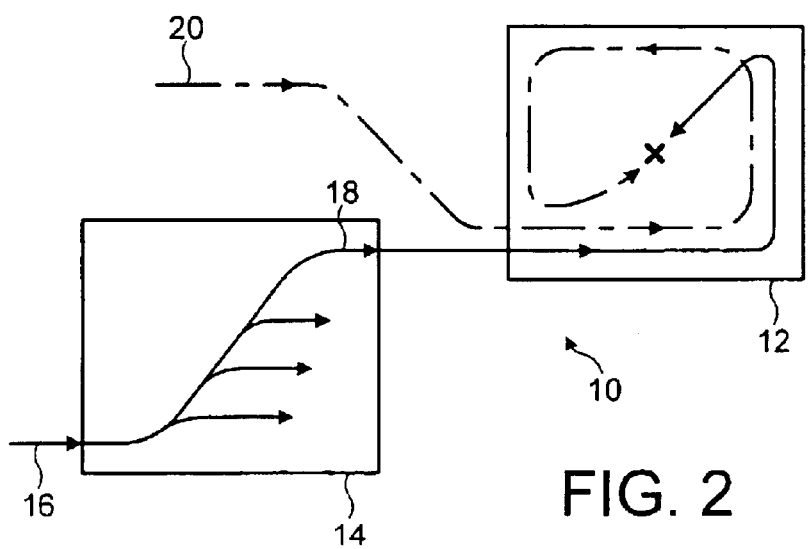
FIG. 2 is a schematic illustration of an optical fibre connection made within the assembly of FIG. 1.
Figure 8:
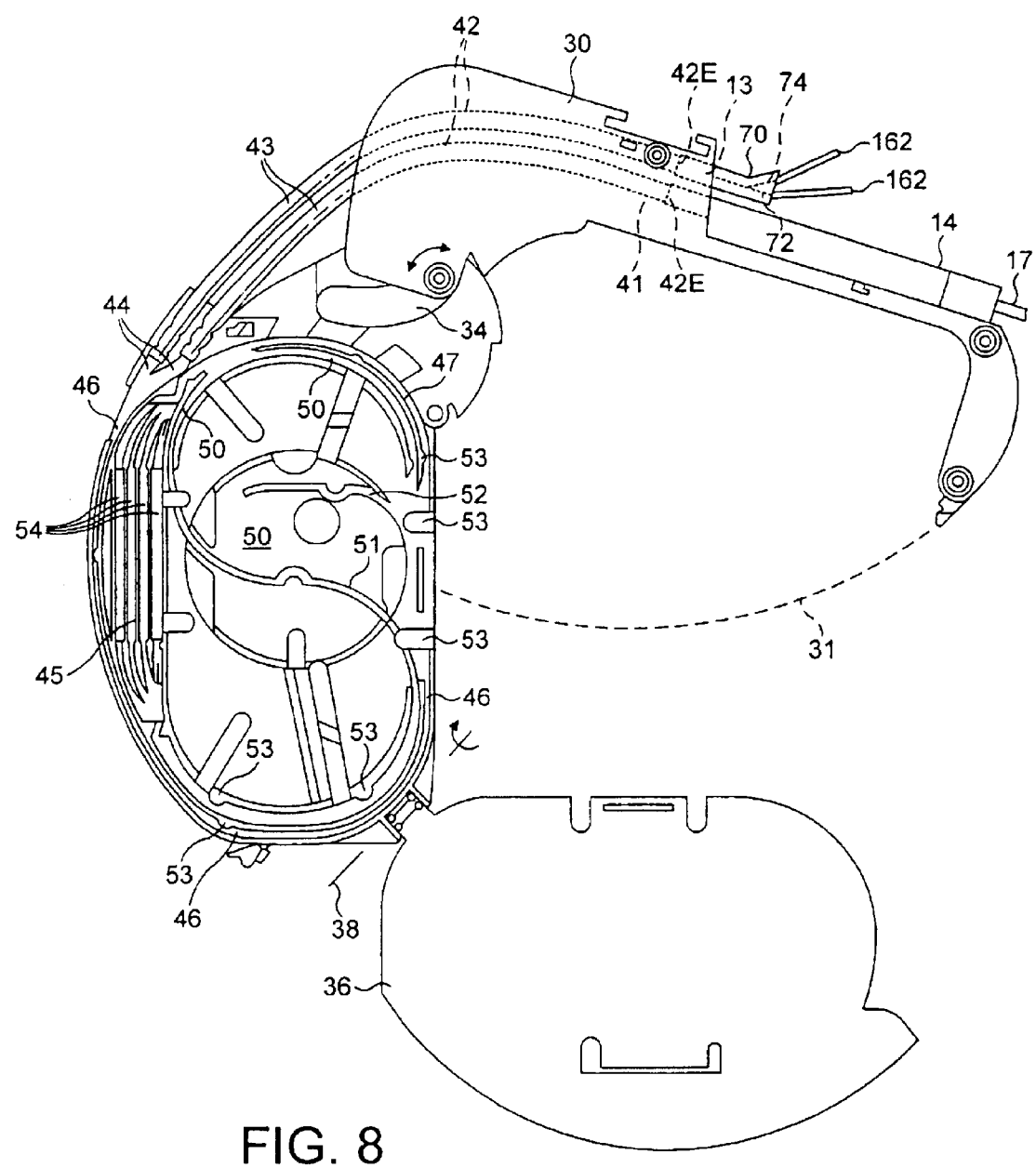
FIG. 8 is a schematic plan view of the assembly showing a fibre routing device coupled to a splice tray and the splice tray in an open condition.

Referring to FIGS. 1 and 8, an assembly 10 for connecting optical fibres comprises a plurality of housings, or splice trays 12, which are stacked one upon the other in interconnected relationship. As shown in FIG. 8, each splice tray comprises three portions. The first portion is in the form of a fixed body portion 30 through which the splice trays connect, preferably by way of snap-fitting engagement means (not shown). The second portion is in the form of a tray 32 that is pivotally connected with the fixed body portion 30 such that it can pivot between a closed position in which the tray is positioned in line with the trays of the other housings (indicated in FIG. 8 by dashed line 31) and an open position in which it projects from the stack. The tray 32 defines a slot 34 through which the pivot point extends. The arrangement of the slot allows the tray to move clear of the stack when moved to the open position. The third portion is a tray lid 36 which is hinged about an axis 38. The tray lid is shown in its open position in FIG. 8 and it will be appreciated that in this position, there is complete access to the interior of the tray in which the fibre connections are made. When in the closed position the lid covers the tray and the tray and lid include a suitable arrangement to provide for a releasable snap-fitting engagement therebetween, when in the closed position.

The fixed body portion 30 has a first inlet 41 for receiving primary optical fibres from a first, or primary side of an optical fibre network and a second inlet 13 for receiving secondary optical fibres from a second, or customer side of an optical fibre network. The inlets 13, 41, lead into respective passages in the form of grooves 42 defined by the fixed body portion. Flexible tubes 43 are fitted into the grooves 42 and extend from the ends 42E of the grooves adjacent the inlets 13, 41 to respective inlet ports, in the form of recesses 44, defined by the tray 32 and in which the tubes 43 interengage.

The function of the tray 12 is to locate optical fibre connections and store excess lengths of fibre and spare lengths of fibre. To this end the tray defines optical fibre guide means for guiding fibres from the tubes 43 within the tray to an interior region, or zone 45, in which connections between the fibres are to be located. The fibre guide means include an outer peripheral track 46 extending along the lefthand side of the tray around the bottom of the tray and part way up the righthand side of the tray; an outer peripheral track 47 extending along the top of the tray adjacent the inlet ports 44; inner peripheral tracks 49 and 50 adjacent the top and bottom of the tray; and a mandrel 50 disposed substantially centrally in the tray and having track 51 extending through it.

As will be understood, optical fibres are guided along these tracks and about the mandrel 50 so that bends therein are not more than the minimum bend radius for the fibre. Using the above mentioned tracks two fibres entering the tray through the inlets 44 can be guided so that they enter the zone 45 from different directions for connection end-to-end, for example by splicing and so that the connections can be located in the zone. In this regard it will be understood that a fibre having a path along track 46 can either continue in the same sense (counter-clockwise in FIG. 8) by passing into track 47 or can be made to change sense by being fed through track 51 and into track 50 and then track 49. It will be noted that track 47 feeds into zone 45 from one direction and track 49 feeds into zone 45 from the other direction.

Before fibre from track 46 is fed to track 47 it may be routed around the mandrel 50 in order to store excess fibre. Likewise before fibre is fed from track 50 to track 49 it may be routed around the mandrel. Further storage is provided on top of mandrel 50 for spare fibre (i.e. fibre which is not presently to be connected to another fibre). This spare fibre is routed to the top of the mandrel via a ramp track 52 after passage along track 46.

Spaced apart retention guides 53 are provided above the various tracks and storage spaces to retain the fibres in those tracks and spaces.

The zone 45 comprises a plurality of parallel walls that define four parallel locations 54 in which optical fibre connections can be located. Each fibre connection is located between and held by an adjacent pair of those walls.

The tray configuration shown in FIG. 8 is shown and described in more detail in the assignee's application U.S. Ser. No. 09/424,042, the content of which is incorporated by reference. However, it is not essential that this configuration is used and there may be many differences in the way that the pathways are arranged. For example, the trays may be removable from the stack other than by the pivotal motion illustrated in FIG. 8. As one example, the trays could slide in and out of the stack with a rectilinear motion in the manner of a drawer.

Figure 9:
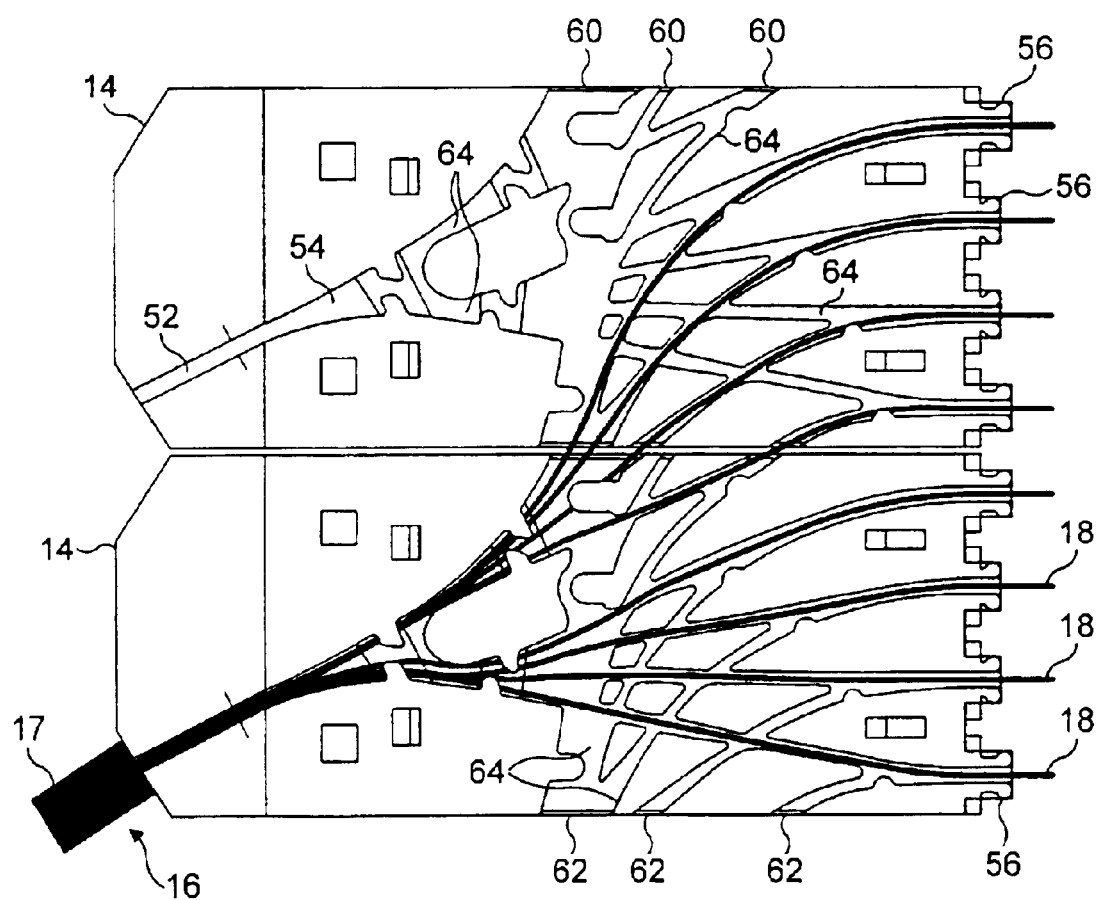
FIG. 9 is a plan view of a fibre guide arrangement for the assembly.

A guide arrangement comprising two guide devices 14 is provided for guiding optical fibres into the first inlets 42 of the splice trays. As shown in FIGS. 1 and 9, the guide devices 14 are essentially rectangular blocks. Each guide device is arranged to serve four splice trays 12 and is preferably snap-fittingly engageable with one or more of the splice trays it serves, although other forms of fixing may be employed.

Referring particularly to FIG. 9, the guide devices 14 of the embodiment have an inlet port 55 for receiving a tubular casing 17 of an optical fibre bundle 16 which has been split off from a primary cable on the primary side of an optical fibre network. The inlet port 55 is in the form of a circular aperture into which the tubular casing 17 can be push-fitted, or plugged. The inlet includes an annular shoulder against which the leading end of the tubular casing 17 abuts so as to limit insertion into the inlet. Extending from the inlet port 55, there is a passage 56, along which fibres from the optical fibre bundle 16 pass into the guide device for routing to the splice trays.

The guide devices each have four outlet ports 57; one for each splice tray with which the device is associated. The outlet ports 57 are defined in projecting portions of the device, which extend into the respective inlets 41.

The guide devices 14 additionally comprise further outlet ports 60 arranged for guiding fibres into an adjacent like guide device and further inlet ports 62 arranged to receive fibres from an adjacent like guide device. In the illustrated example, there are three outlet ports 60 and inlet ports 62, although a greater or lesser number could be provided.

A plurality of fixed guide channels 64 is provided in each guide device for guiding fibres from both the passage 56 and further inlet ports 62 to the outlet ports 57 and further outlet ports 60. The network of guide channels 64 provides a multiplicity of routes for the fibres allowing considerable flexibility for directing fibres to the required splice tray. For example, as shown in FIG. 9, by making use of the further inlet and outlet ports 60, 62 to direct fibres laterally from one guide device to another, the individual fibres from an optical fibre bundle 16 containing eight fibres or twelve can be directed to respective outlet ports 57 such that the fibres are received in separate trays 12, without splitting the optical fibre bundle upstream of the guide devices.

The guide devices 14 are described in more detail in the applicant's co-pending European application entitled "An Assembly for use in Connecting Optical Fibres" (Application EP01305038.0), the content of which is incorporated herein by reference. Although, it is preferable that guide devices as hereinbefore described are used, it is to be understood that this is not essential and other devices may be utilised for directing fibres into the inlets 42. For example, the prior art guide devices shown and described in U.S. Ser. No. 09/424,042 could be used instead.

As shown in FIG. 8, a fibre routing device 70 is provided for routing fibres from a customer side of an optical fibre network into a splice tray 12 via the second inlet 13. Details of the fibre routing device 70 are more clearly shown in FIGS. 3 to 5.

Figure 3:
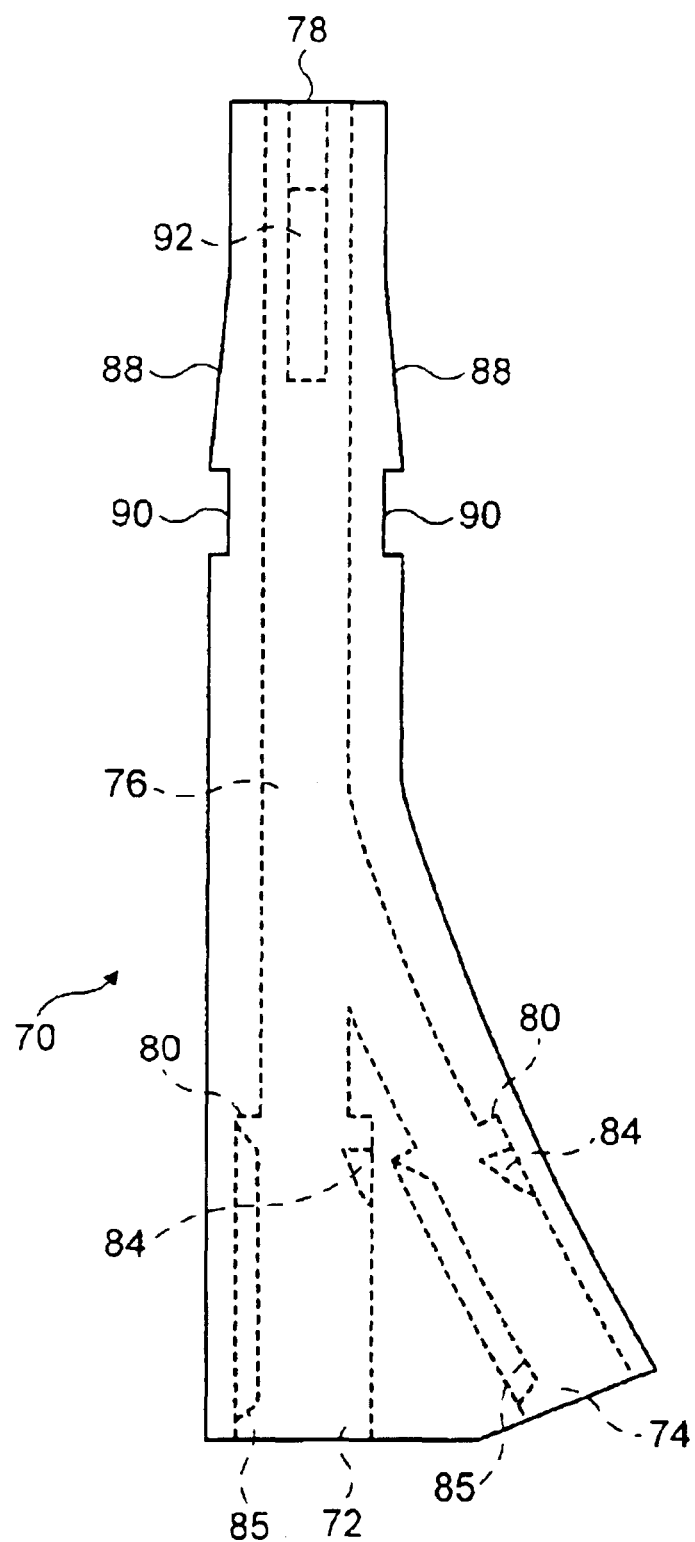
FIG. 3 is a plan view of an optical fibre routing device for use with the assembly of FIGS. 1 and 2.

The fibre routing device 70 is a unitary plastics moulding, preferably made of a transparent polycarbonate. Referring to FIG. 3, the device 70 has two inlets 72, 74 which lead to a common passage 76 connecting the inlets with an outlet 78. The inlets 72, 74 are preferably in the form of circular section bores (in FIG. 5 inlet 72 shows an alternative section bore that may be used). The inlet bores extend into the body of the device to respective annular shoulders 80, which as explained below, act as stops. The inlets preferably have a chamfered lead-in 82.

The inlet bores 72, 74 each define one or more projections, or barbs, 84 (shown in exaggerated form in FIG. 3.) As explained in more detail below, these barbs are arranged to engage a tube inserted into the inlets in order to provide a force resisting, but not preventing, withdrawal of the tube from the inlet. To further assist in engaging the tubes, the inlets are provided with elongate ribs 85 (again shown exaggerated in FIG. 3) that are disposed generally opposite the barbs and extend in the lengthways direction of the inlet. The ribs 85 are preferably generally triangular in section and have an inclined leading end to facilitate insertion of a tube into the respective inlet bore.

Figure 5:
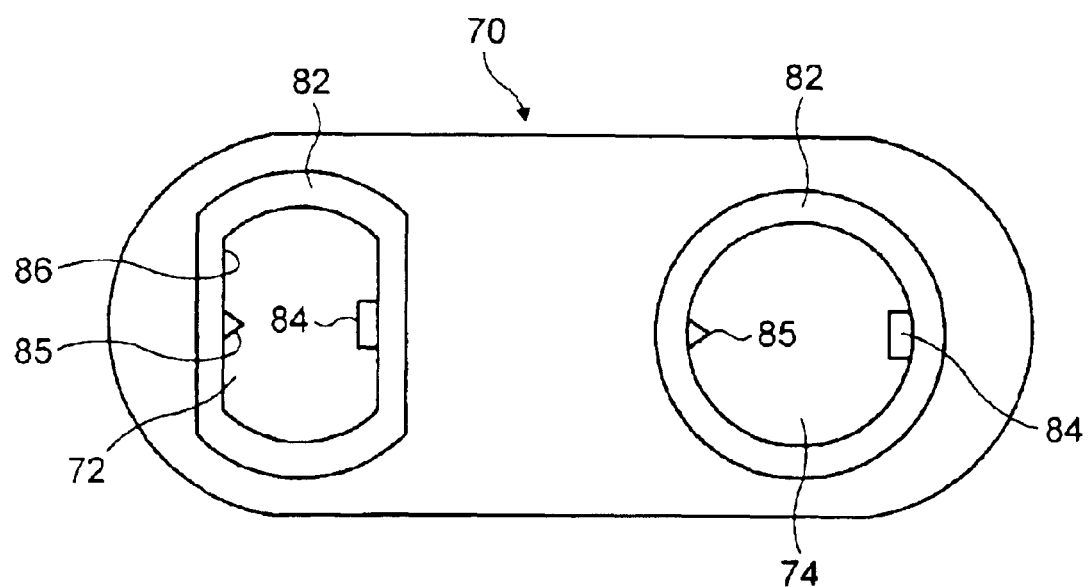
FIG. 5 shows the opposite end elevation to FIG. 4, illustrating alternative fibre inlets for the routing device.

As shown in FIG. 5, the inlets may be provided with flat side walls 86. These flat walls are arranged to create an interference with a circular section tube inserted into the inlet and may augment the resisting force provided by the barbs. Alternatively, the flattened side walls may be provided instead of the ribs and/or barbs.

Figure 4:
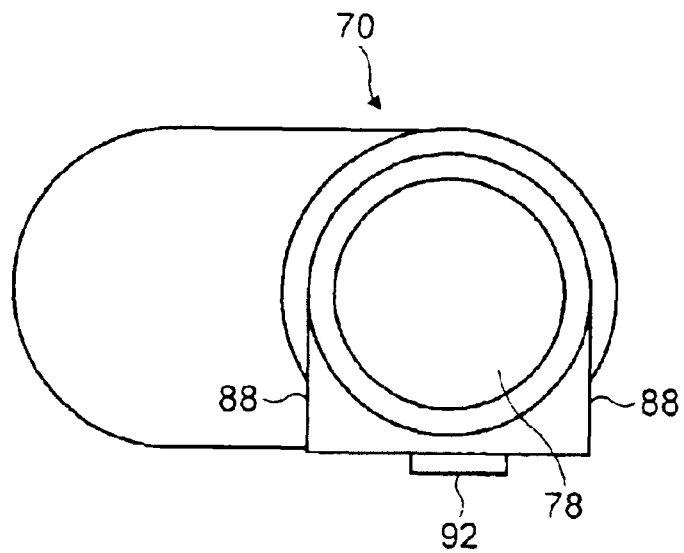
FIG. 4 shows an end elevation of the device of FIG. 3.

The end 87 of the fibre routing device 70 adjacent the outlet 78 is configured to serve as an insert portion for axial insertion into the second inlet 13 of the splice tray. The insert portion 87 is of generally circular cross-section with opposed flat extension walls 88 (FIG. 4). The walls 88 taper in their lengthways direction, increasing in thickness in the axially inward direction of the passage 76. Opposed recesses, or notches, 90 are provided at the axially inward ends of the walls 88. The underside of the insert portion 87 is provided with an elongate rib 92 which extends parallel to the passage 76. The rib has a tapered lead-in, after which it has a constant height.

The walls 88, notches 90 and rib 92 are arranged to interengage complementary barbs and depressions (not shown) provided in the inlet 13 such that the routing device can be snap-fittingly engaged in the inlet by a simple axial pushing movement. The arrangement is such that once the insert portion is inserted into the second inlet 13, the routing device 70 is located and supported relative to the housing. Preferably the routing device once inserted, can only be removed by the exertion of considerable force. Importantly, the arrangement should be such that the device cannot be accidentally knocked out of position in the inlet.

Optionally, and as explained in more detail below, the routing device 70 may be used in association with a manifold 100, which will now be described with reference to FIGS. 6 and 7.

The manifold 100 is a unitary plastics moulding, preferably made of a transparent polycarbonate. The moulding has a generally circular cross-section and has a larger diameter first end 102 connected with a smaller diameter second end 104 by a tapering central portion 106. An axially extending passage 108 passes through the manifold and at the second end 104 defines an outlet 110. As shown in FIG. 7, the diameter of the passage increases at the junction of second end 104 and tapering portion 106 such that an annular shoulder, or stop, 112 is defined.

There are four elongate channels, or passages, 114 provided at equispaced intervals around the circumference of the through-passage 108. The channels are generally circular in cross-section and extend from the end 115 of the manifold opposite the outlet 110 to the region of the annular shoulder 112. The pitch circle diameter on which the channels 114 are centred is selected such that each channel has a side that opens into the through-passage 108 so that the channels are not closed passages, but instead have a side opening into the passage 108. As shown in FIG. 7, the passages 114 taper between the shoulders 112, 116.

Each channel 114 has a larger diameter portion which extends axially inwardly of the manifold from the end 115 to a shoulder 116. An elongate rib 118 is provided in this larger diameter portion (as shown in exaggerated form in FIGS. 6 and 7). The ribs 118 extend generally parallel to the through-passage 108 and have tapered lead-in portions 120.

Figure 6:
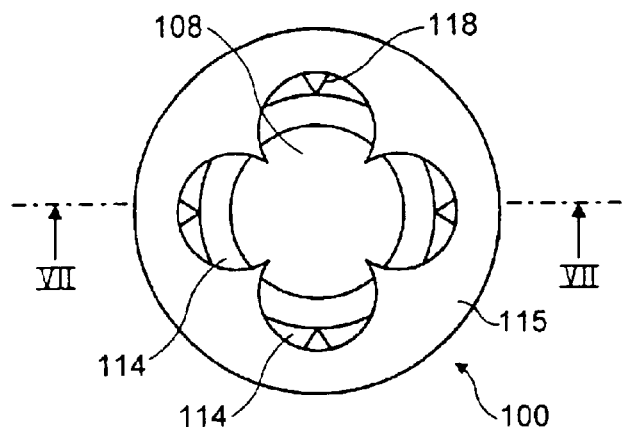
FIG. 6 shows an end elevation of a manifold for use with the assembly of FIGS. 1 and 2.
Figure 7:
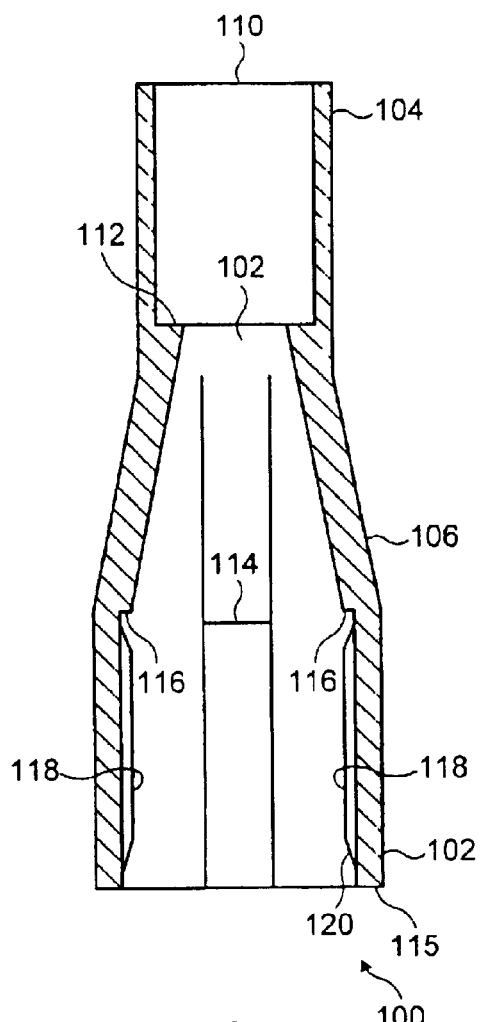
FIG. 7 is a section on lines VII—VII in FIG. 6.

Although not shown in FIGS. 6 and 7, the outlet 110 and channels 114 each, preferably, have a tapered lead-in.

Figure 10:
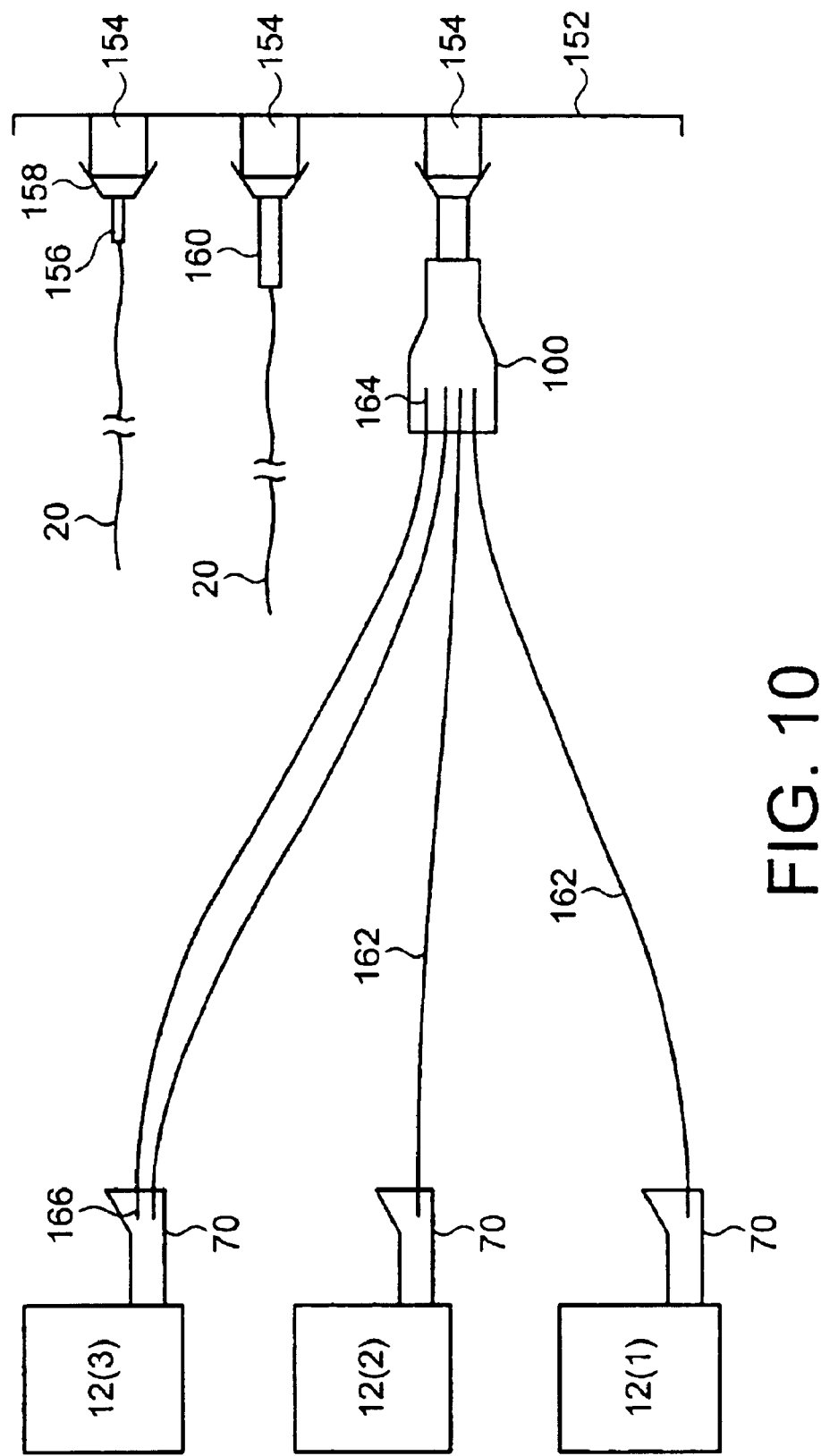
FIG. 10 is a schematic illustration of stages in the routing of secondary optical fibres utilising the fibre routing device and manifold of FIGS. 3 to 7.

The routing of a four fibre EPFU on the customer side of an optical fibre network to three splice trays 12(1), 12(2), 12(3) will now be described with particular reference to FIG. 10, which illustrates stages in the routing procedure.

Typically, a joint will include a mounting arrangement for the splice trays. This mounting arrangement preferably has a base plate 152 in which is fixed a number of tubes 154. These tubes may have preinstalled EPFUs, or the EPFUs may be installed by blown fibre installation techniques known in the art. In either case, a suitable length of fibre bundle, or EPFU, 156 will project from the tube to permit connection to the splice trays. Preferably, a water block connector 158 is slid over the fibre bundle and onto the tube 154 to prevent the ingress of water into the tube. The water block connector is preferably made of rubber or a similar material and is sized so as to seal the end of the tube 154.

The tubular casing of the fibre bundle 156 is then stripped back to a point, for example 10 mm, above the water block connector to expose the secondary fibres 20. A short tube 160 is then slid over the exposed fibres and seated on the water block connector 158. The outlet 110 of a manifold 100 (illustrated in FIGS. 6 and 7) is then push-fitted onto the tube 160 until the end of the tube remote from the water block connector abuts the annular shoulder 112. The four exposed secondary fibres 20 are then separated into respective channels 114 in the manifold, making sure they do not crossover at the shoulder 112. A length of transport tube 162 is then fed over each fibre and the leading end 164 of each tube is pressed into the respective channel until it abuts the shoulder 116, which acts as a depth stop. The transport tube is preferably a 3 mm outside diameter tube, made of a material having a low coefficient of friction, for example, polythene.

Fibre routing devices 70 are fixed into the inlet 13 of each of the three splice trays. The inlets 72, 74 of the routing devices to which each fibre is to be routed are selected. The fibres are fed into the selected inlets and into the respective splice trays. The opposite ends 166 of the transport tubes are then inserted into the respective inlets 72, 74 until they abut the shoulder 80 at the end of the inlet bore. The ends of the secondary fibres thus inserted into the splice trays can then be spliced to a primary fibre also housed in the splice tray, or coiled and stored ready for later use. As shown in FIG. 10, a single secondary fibre is routed to the splice trays 12(1) and 12(2) and two fibres are routed to splice tray 12(3). In this arrangement, only one inlet 72, 74 of each of the routing devices fitted to splice trays 12(1) 12(2) is in use, whereas both inlets of the routing device associated with splice tray 12(3) are used. Typically, the secondary fibres routed into splice trays 12(1), 12(2) would be spliced to a primary fibre as would one of the secondary fibres fed into splice tray 12(3). The other secondary fibre fed into splice tray 12(3) would be stored therein as a spare. It is preferable where both inlets of the fibre routing device are used, to utilise the inlet 74 to route the 'stored' fibre and the inlet 72 to route the 'live' fibre and where only one inlet is used, to leave the inlet 74 spare. As can be seen in FIG. 8, the inlet 72 is adjacent the guide devices 14 whereas the inlet 74 is somewhat further away. It will be appreciated that if further work is required it is easier for the installer to work on the side of the routing device furthest from the guide devices and that this lessens the likelihood of the other fibre in the routing device being disturbed.

Illustrative examples of fibre routing utilising the fibre routing device 70 and manifold 100 will now be described with particular reference to FIGS. 1 and 9 to 11.

In an arrangement such as that shown in FIG. 1, where there are eight splice trays, fibres from one or more optical fibre bundles 16 that have been split off from a primary cable on a primary side of an optical fibre network can be routed into the splice trays in a number of ways. For example, as shown in FIG. 9, the fibres 18 from an eight fibre optical fibre bundle 16 can be routed such that they are fed to the trays on a one fibre per tray basis. Alternatively, and again referring to FIG. 9, a second eight fibre optical fibre bundle (not shown) could be fed into the inlet 52 of the uppermost of the two guide devices. In this case, the fibres could be routed such that two fibres 18 are fed into each tray. Alternatively, a further four trays 12 might be added to the stack together with a further guide device 14. In this case, the sixteen fibres from the two optical fibre bundles 16 could be routed to the trays such that some trays receive a single fibre and others two fibres. As another alternative, two twelve fibre optical fibre bundles could be plugged into the three guide devices and the twenty four fibres routed to the twelve trays on a two fibre per tray basis. In view of the foregoing, it will be appreciated that, as discussed in greater detail in the applicant's co-pending application, there is considerably flexibility in the routing of fibres into the tray from the primary side of the network.

By utilising the fibre routing device 70 and manifold 100, similar routing flexibility can be obtained on the secondary side of the network. As described above, typically, secondary fibres linking to customer locations are blown along tubes and arrive at the joint installation in four fibre bundles, or EPFUs 156.

Figure 11:
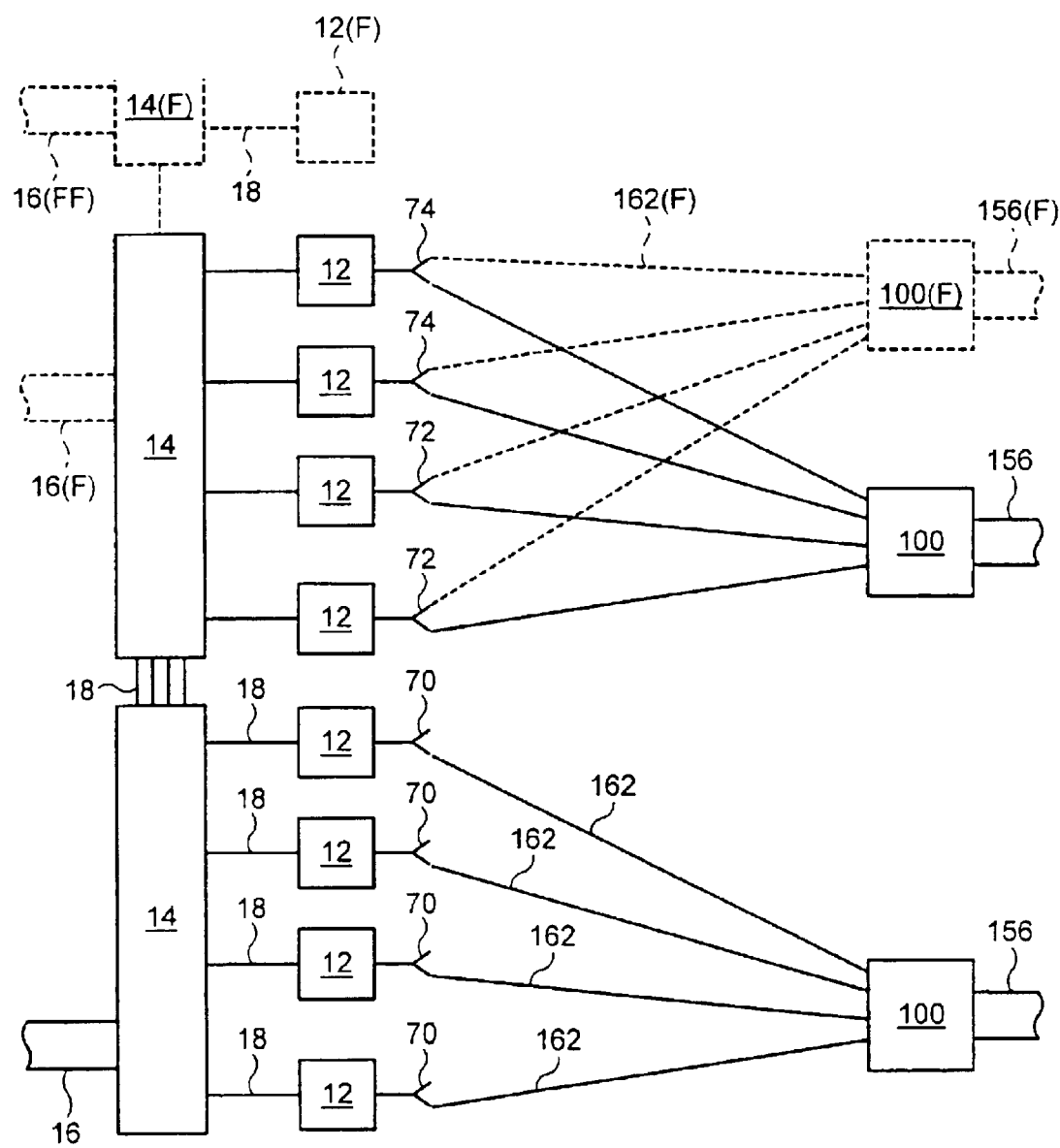
FIG. 11 is a schematic illustration of a joint installation using the fibre routing device and manifold.

Taking the case illustrated by FIGS. 9 and 11, on the primary side of the network, an eight fibre optical fibre bundle 16 is fed into a stack of eight splice trays 12 on a one fibre per tray basis. On the secondary side, two four fibre EPFUs 156 are fed to the splice trays via a manifold 100 and eight fibre routing devices 70 (one for each tray) so that each tray receives one primary fibre and one secondary fibre in the manner indicated in FIG. 11 for the four lower trays. In each case the primary and secondary fibres could be spliced in the respective splice trays providing eight circuits leading to respective customer locations. In this case, only one inlet of each routing device 70 would be used.

However, at the time of installation, a further four fibre EPFU 156 (F) (represented by dashed lines) may be provided on the secondary side of the network as spare capacity for future use. Fibres from this EPFU can be fed into the splice trays via a third manifold 100(F) (indicated with the spare fibres in FIG. 11 by means of dashed lines). The spare secondary fibres can be housed in transport tubes 162 (F) and fed from the third manifold 100(F) into respective ones of the splice trays 12 through the second inlets 74 provided in the fibre routing devices 70. Within the tray the spare fibres can be routed to a storage location within the splice tray, ready for future use.

When it is desired to use a spare secondary fibre, it can be removed from the tray by withdrawal of its transport tube 162(F) from the inlet 74 in the fibre routing device and redirected to the fibre routing device of a further splice tray 12(F) added to the stack (also indicated by dashed lines). This further splice tray can be fed with primary fibre via a further eight or twelve fibre optical fibre bundle 16(F) feeding into the unused inlet of the existing guide devices and then feeding into a further guide device 14(F) (again indicated by dashed lines) via the further inlet and outlet ports 60, 62. Alternatively, a further optical fibre bundle 16(FF) might plug into the inlet of the further guide device 14(F). The primary fibre in the further splice tray 12(F) can then be spliced to the previously spare secondary fibre rerouted from one of the splice trays 12, to provide a new circuit to a customer location. In this way, the fibres can be routed so as to maintain a one customer per tray arrangement, which may be considered desirable. Furthermore, because each spare secondary fibre enters the splice tray in which it is stored via its own inlet in the fibre routing device 70, it can be withdrawn from that tray and routed to the new tray without disturbing the existing connection in the tray in which it was stored.

If at any time the spare secondary fibre(s) are to be used and the space available at the joint installation does not permit the addition of further splice trays 12(F) and guide devices 14(F), the fibres of a further optical fibre bundle 16(F) could be plugged into the unused inlet of the existing guide devices 14, with four fibres being routed to the splice trays associated with the respective guide device via its outlet ports 57. These primary fibres could then be spliced to the secondary fibres previously stored in those splice trays thereby providing two circuit connections in those trays. As described in this example, four fibres from the optical fibre bundle 16(F) would be wasted. However, it will be appreciated that in practice there will typically be many more splice trays and associated guide devices providing considerably more options for plugging in additional optical fibre bundles 16 on the primary side of the network, without fibre wastage.

It will also be appreciated that by using the routing device 70 and, where appropriate, the manifold 100, considerable flexibility is provided in the routing of additional secondary fibres to, or rerouting secondary fibres from, the splice trays, allowing the possibility of maximum usage of the capacity of the splice trays at a joint installation.

It will be understood that by suitable shaping of the outlet end of the fibre routing device 70 to match a secondary side inlet of previously installed splice tray, the fibre routing device can be retrofitted to existing installations thereby providing the option of increasing the capacity of those installations.

What is claimed is:

1. An assembly for use in connecting optical fibres, said assembly comprising a housing for optical fibre joints and a fibre routing device associated with said housing, said housing having a first inlet for receiving optical fibres from a primary side of an optical fibre network and a second inlet for receiving optical fibres from a customer side of an optical fibre network and defining pathways leading from said first and second inlets to an interior region of said housing that includes locating portions for locating optical fibre joints, and said fibre routing device having an insert portion axially insertable into said second inlet for locating and supporting the routing device relative to the housing, at least two inlets for receiving optical fibres from said customer side of the optical fibre network and an outlet defined in said insert portion and connected with said routing device inlets such that fibres from said customer side of an optical fibre network received in said routing device inlets are routed into said second inlet of the housing via said routing device outlet.

2. An assembly as claimed in claim 1, wherein said insert portion is snap-fittingly engageable in said second inlet.

3. An assembly as claimed in claim 1, wherein said fibre routing device is a unitary plastics moulding.

4. An assembly as claimed in claim 1, wherein said fibre routing device inlets comprise respective passageways each arranged to receive an end of a tube for housing optical fibres and arranged to engage said tube such that a force resisting withdrawal of the tube is provided.

5. An assembly as claimed in claim 4, wherein a barb is provided in each said passageway to provide said resisting force.

6. An assembly as claimed in claim 4 or 5, wherein each said passageway is provided with elongate ribbing extending in a lengthways direction of the passageway to provide said resisting force.

7. An assembly as claimed in claim 4, wherein each said passageway includes a stop arranged to limit insertion of said tube into the passageway.

8. An assembly as claimed in claim 4, further comprising a manifold, said manifold defining a plurality of engaging portions, each arranged to engage an opposite end of said tube and an outlet end arranged to engage a fibre enclosing part.

9. An assembly as claimed in claim 8, wherein said outlet end comprises a passageway arranged to receive said fibre enclosing part.

10. An assembly as claimed in claim 8, wherein said manifold comprises a unitary plastics moulding.

11. An assembly as claimed in claim 8, wherein said engaging portions comprise respective passageways each having a protrusion therein arranged to provide a resistance to withdrawal of said end of a tube engaged therein.

12. An assembly as claimed in claim 11, wherein said protrusion comprises an elongate rib extending in a lengthwise direction of the passageway.

13. An assembly as claimed in claim 11, wherein said manifold defines a generally axially disposed lengthways extending through-passageway, one end of which defines said outlet end and said passageways defining said engaging portions each extend in said lengthways direction and each have a lengthways extending side opening that opens into said through-passageway, said openings extending over at least a portion of the lengthways extent of said passageways.

14. An assembly as claimed in claim 11, wherein said passageways defining said engaging portions each include a stop arranged to limit insertion of said tube therein.

15. An assembly as claimed in claim 1, further comprising a plurality of said housings and a guide arrangement for guiding optical fibres from said primary side of an optical fibre network into said housings, said guide arrangement including at least two guide devices mounted side-by-side, each said guide device having at least one inlet port for the passageway of optical fibres into the guide arrangement, at least one outlet port associated with said housing for guiding optical fibres into the associated housing, at least one further inlet port for receiving optical fibres from another one of said guide devices when positioned at a first side thereof and at least one further outlet port for guiding optical fibres to another one of said guide devices when positioned at a second side thereof.

16. An optical fibre installation comprising an assembly as claimed in claim 15, wherein at least one said housing receives two optical fibres from said first side of an optical fibre network through said outlet port of the guide device associated therewith and two optical fibres from said customer side of an optical fibre network through said fibre routing device feeding to said second inlet of the housing, said two optical fibres from said second side entering said fibre routing device through a respective said inlet of said routing device.

17. An optical fibre installation comprising an assembly as claimed in claim 1.

18. A method of routing optical fibres to an optical fibre joint, said method comprising:

introducing at least one optical fibre from a primary side of an optical fibre network into a first of two inlets of a housing for optical fibre joints;

axially inserting an outlet end of a fibre routing device into a second of said two inlets such that an outlet of said fibre routing device feeds into said second inlet and said fibre routing device is located and supported relative to said housing by engagement between said outlet end and said second inlet, said fibre routing device having a plurality of entry points for optical fibres which entry points feed to said outlet; and introducing an optical fibre from a customer side of an optical fibre network into said housing by routing said optical fibre through a first of said entry points, said outlet and said second inlet of the housing.

19. A method as claimed in claim 18, further comprising feeding another optical fibre from said customer side into said housing through a second of said entry points.

20. A method as claimed in claim 19, further comprising splitting a plurality of said optical fibres from said customer side of an optical fibre network from a bundle containing said fibres, routing said fibres through a manifold having a plurality of fibre guiding channels to respective said entry points of a plurality of said routing devices each connected with a respective said second inlet.

21. An optical fibre installation comprising:

a plurality of housings for optical fibre joints arranged in a stack, said housings each having a first inlet for receiving optical fibres from a primary side of an optical fibre network, a second inlet for receiving optical fibres from a customer side of an optical fibre network and defining tracks for optical fibres leading from said first and second inlets to an interior region of said housing that includes locating portions for locating optical fibre joints;

a guide assembly for guiding optical fibres from said primary side of an optical fibre network into said housings, said guide assembly being mounted on said stack of housings and having at least one inlet port for receiving primary optical fibres and a plurality of outlet ports, each said outlet port being associated with a first inlet of one of said housings; and a plurality of fibre routing devices, each said fibre routing device having an insert portion axially inserted into said second inlet of said housing such that the routing device is located and supported relative to said housing by interengagement between the second inlet of the housing and the insert portion of the routing device and an inlet end disposed externally of the housing and having at least two inlets for receiving optical fibres from said customer side of the optical fibre network, said at least two inlets being connected by passageways with an outlet defined in said insert portion such that optical fibres from said customer side of an optical fibre network received in said at least two inlets are routed into the said second inlet of the housing in which the insert portion is inserted via the routing device outlet.

22. An installation as claimed in claim 21, further comprising an optical fibre unit on said customer side of an optical fibre network, a manifold having a first end connected with said customer side optical fibre unit and having a passageway for optical fibres extending from said first end and a plurality of recesses at a second end thereof opposite said first end, and a plurality of flexible tubes each having a first end fitted into a respective one of said recesses and a second end fitted into an inlet of said fibre routing device, said optical fibre units comprising a plurality of optical fibres that enter said passageway and pass into said tubes through which the said optical fibres are fed into said housings via the respective routing devices in which said tubes have their second ends fitted.

23. An installation as claimed in claim 22, further comprising an optical fibre unit on said primary side of an optical fibre network, said optical fibre unit having a plurality of optical fibres feeding into said housings guided by said guide assembly, at least some of said optical fibres of said primary side optical fibre unit being connected to optical fibres from said customer side optical fibre unit in said housing.

24. An optical fibre installation as claimed in claim 23, wherein at least one optical fibre from said primary side optical fibre unit or said customer side optical fibre unit is not connected to another optical fibre and has an end disposed in a storage position in said housing.

* * * * *